(12) United States Patent
Nitzsche

(10) Patent No.: US 6,617,295 B2
(45) Date of Patent: Sep. 9, 2003

(54) COMPOSITION AND METHOD FOR FOAMING RESIN

(75) Inventor: Norman E. Nitzsche, Willard, OH (US)

(73) Assignee: PolyOne Corporation, Avon Lake, OH (US)

( * ) Notice: Subject to any disclaimer, the term of this patent is extended or adjusted under 35 U.S.C. 154(b) by 0 days.

(21) Appl. No.: 10/171,055

(22) Filed: Jun. 13, 2002

(65) Prior Publication Data

US 2002/0198123 A1 Dec. 26, 2002

Related U.S. Application Data

(63) Continuation of application No. 10/126,312, filed on Apr. 19, 2002, which is a continuation-in-part of application No. 09/844,459, filed on Apr. 27, 2001, now Pat. No. 6,384,002.
(60) Provisional application No. 60/302,264, filed on Jun. 29, 2001.

(51) Int. Cl.[7] .............................. C11D 3/10; C11D 3/14; C11D 3/18
(52) U.S. Cl. ...................... 510/188; 510/208; 510/395; 510/445; 510/478; 510/488; 510/499; 510/500; 264/39
(58) Field of Search ............................ 264/39; 510/188, 510/208, 395, 445, 478, 488, 499, 500

(56) References Cited

U.S. PATENT DOCUMENTS

| | | | |
|---|---|---|---|
| 2,952,888 A | 9/1960 | Cornelius | 25/156 |
| 3,764,362 A | 10/1973 | Hinley et al. | 106/300 |
| 3,778,288 A | 12/1973 | Ridge et al. | 106/308 |
| 3,844,810 A | 10/1974 | Pollard | 106/308 N |
| 3,869,525 A | 3/1975 | Miller | 260/873 |
| 4,080,134 A | 3/1978 | Klaeysen et al. | 425/143 |
| 4,092,285 A | 5/1978 | Leo et al. | 260/28.5 R |
| 4,275,100 A | 6/1981 | Datta | 369/286 |
| 4,446,086 A | 5/1984 | Molenaar et al. | 264/118 |
| 4,789,321 A | 12/1988 | Dingus | 425/222 |
| 4,834,902 A | 5/1989 | Pioch et al. | 252/135 |
| 4,838,945 A | 6/1989 | Fujii et al. | 134/7 |
| 5,076,339 A | 12/1991 | Smith | 164/72 |
| 5,139,694 A | 8/1992 | Kmiec | 252/174.23 |
| 5,176,751 A | 1/1993 | Findley | 106/502 |
| 5,236,514 A | 8/1993 | Leung et al. | 134/22.14 |
| 5,256,185 A | 10/1993 | Semel et al. | 75/255 |
| 5,395,456 A * | 3/1995 | Abrams et al. | 134/22.14 |
| 5,424,012 A | 6/1995 | Ertle et al. | 264/39 |
| 5,443,768 A | 8/1995 | Scheibelhoffer et al. | 264/39 |
| 6,060,445 A | 5/2000 | Chandraker et al. | 510/475 |
| 6,384,002 B1 | 5/2002 | Nitzsche | 510/188 |
| 2002/0193267 A1 * | 12/2002 | Nitzsche | 510/188 |

FOREIGN PATENT DOCUMENTS

| | | | |
|---|---|---|---|
| GB | 2087787 | 6/1982 | B29B/1/02 |
| JP | 61215248 | 9/1986 | C04B/35/00 |

OTHER PUBLICATIONS

*The Production of A–C Polyethylene Color Concentrates*, Technical Data Brochure for Plastics, No. PLS–002, from Allied Corp., Morristown, NJ (undated) 3 pages. No Date Given.
*Series CL Laboratory Pellet Mills*, from California Pellet Mill Company, 1987, 4 pages No Month Given.
*Mineral Fillers in the Plastics Industry–A Review*, Technical Note No. 184, from Polymers & Plastics dated Aug. 26, 1999, pp. 1–14.
Fillers and Reinforcing Agents in Plastics–Physical Chemical Aspects for the Processor, Technical Note No. 172, from Polymers & Plastics dated Aug. 26, 1999, pp. 1–13.

* cited by examiner

Primary Examiner—Yogendra N. Gupta
Assistant Examiner—Brian P. Mruk
(74) Attorney, Agent, or Firm—Hudak, Shunk & Farine Co. LPA; John H. Hornickel

(57) ABSTRACT

The present invention relates to a composition which can be utilized to induce foaming of a resin or polymeric material in polymer processing machinery. The composition of the present invention includes a blowing agent which decomposes and evolves gases thereby causing the polymeric material to foam. The compositions of the present invention allow for reductions in part weight, cycle times and injection pressure.

20 Claims, No Drawings

COMPOSITION AND METHOD FOR FOAMING RESIN

CROSS REFERENCE

This application claims the benefit of prior filed co-pending provisional application 60/302,264 filed Jun. 29, 2001 of the same title; and a continuation-in-part of co-pending non-provisional application Ser. No. 10/126,312 filed Apr. 19, 2002, which is a continuation-in-part of prior application Ser. No. 09/844,459, filed Apr. 27, 2001, now U.S. Pat. No. 6,384,002, both entitled "A Composition and Method for Purging Polymer Processing Equipment."

FIELD OF THE INVENTION

The present invention relates to a composition which can be utilized to induce foaming of a resin or polymeric material in polymer processing machinery. The composition of the present invention includes a blowing agent which decomposes and evolves gases thereby causing the polymeric material to foam. The compositions of the present invention allow for reductions in part weight, cycle times and injection pressure.

BACKGROUND OF THE INVENTION

Many thermoplastic polymeric materials or resins are processed in polymer processing equipment such as injection molding devices. The pressures at which the materials are molded are quite high and cause premature wear of the processing equipment. The premature wear can result in costly expenditures which can increase the cost of preparing molded articles.

Molded articles or substrates often shrink unevenly after being molded at the relatively high pressure and thus have imperfections. Often the molded articles with imperfections are unacceptable to the end user and must be scrapped. The compositions of the present invention can be utilized to minimize equipment wear and produce quality parts.

SUMMARY OF THE INVENTION

The present invention provides a composition for foaming resin or polymeric material upon the flow of a stream of the blend polymeric material and composition through polymer processing machinery. The foaming or expansion of the resin brought about by the composition of the invention enables the polymeric material to flow through the polymer processing machinery under pressures that are lower than the pressures that are otherwise needed in the absence of such foaming. The composition includes a mixture of additives separate from the polymeric material in a state pourable into the stream of polymeric material. The additives include a blowing agent effective to induce foaming of the stream of polymeric material, and at least one filler. The additives further include a surfactant effective to reduce surface tension of the blend and thus promote the flow of the stream of polymeric material along the inner surfaces of the polymer processing machinery. A binder binds the additives together in the mixture.

The present invention also provides a method for foaming resin as the resin passes through the processing machinery. The method includes blending a composition comprising a blowing agent, a filler, a surfactant, and a binder with a polymeric material or resin, to form a mixture, processing said mixture in a polymer processing apparatus, and forming a molded article from said mixture. A method for preparing the compositions of the present invention is also described.

This invention allows the processor to open processing windows regarding machine size, tool design, and resin choices. It will also provide weight reduction resulting in lower conversion costs. The invention also gives the processor the ability to reduce cycle times, improve the quality of finished product and reduce process times.

DETAILED DESCRIPTION OF THE INVENTION

A) Foaming Compositions

The compositions of the present invention are useful to improve the processability of polymeric material or resins and are capable of reducing part weight, peak injection pressure, shot size, and molding cycle time. Thus substantial cost savings are available to the processors of injection molded articles or substrates who utilize the compositions of the present invention in conjunction with polymeric materials.

Blowing or foaming agents are utilized in the composition of the present invention. Blowing agents can be endothermic, exothermic, or a combination thereof. The specific blowing agent utilized is selected to be active at or below the processing temperature or range of the polymeric material being processed. Typical blowing agents, when activated, evolve or produce a gas such as nitrogen or carbon dioxide. As the gas evolves, the volume of the composition and polymeric material mixture expands within the processing device. In order to prevent the blowing agent from prematurely activating or decomposing, the compositions are processed and preferably formed into particles below the activation temperature of the blowing agent. The particles are a dispersion or conglomerate of the components of the present invention in a solid, non-liquid particulate form such as but not limited to pellets, granules and flakes, with pellets being preferred.

During molding of a polymeric material and the composition of the present invention at elevated temperatures sufficient to degrade or activate the blowing agent, endothermic blowing agents will absorb heat as they degrade, which can reduce the cure time (mold closed) during a molding operation. The melt flow (polymer and composition) is placed under greater pressure by the blowing agent due to the evolution of gas. Accordingly, the injection pressures, as well as injection fill times can be reduced which results in both time and energy savings. The creation of a micro cellular structure within the melt will eliminate molding flaws such as sinks in the molded article. Cell structure is dictated by at least the volume of gas present in the melt flow (ml/gm) and the particle size of the nucleator. Eliminating or reducing the pack and hold portion of the injection cycle can also control over-packing. Also, a short shot of a reduced amount of polymeric material and composition can be utilized to fill the cavity to capacity due to the cell expansion of the blowing agent. The compositions of the present invention will allow one to fill tools or mold cavities, which are oversized, for barrel capacity by increasing the overall volume.

Suitable commercially available blowing agents available from Mats Corp. Ltd. of Markham, Ontario as MS01, Cenblo Mat 100 or 500 (a carboxylic acid and carbonate based product), Uniroyal Chemical Company, Inc. of Middlebury, Conn., as Expandex® 5PT (a 5-phenyl tetrazole based product), EPI Environmental Plastics Inc. of Conroe, Tex., as EPIcor, Uniroyal Chemical Company of Middlebury, Conn., as Expandex and Reedy International Corp. of Keyport, N.J. as Safoam.

Non-limiting examples of endothermic blowing agents are polycarbonic acids, coated sodium bicarbonate, coated citric acid, coated mono sodium citrate, and coated sodium citrate. Exothermic blowing agents include azodicarbonamides, modified azodicarbonamides, oxybis benezenesulfonyhydrazide (OBSH), toluenesulfonyhydrazides (TSH), 5-pheyltetrazole (5-PT), diisopropylhydrazodicarboxylate (DIHC), and dinitrosopentamethylenetetramine (DNPT).

A binder component is utilized in the flow improving foaming compositions of the present invention. The binder can beneficially unite the other components present and render them more dispersible in the polymeric material to be processed. The binder component includes waxes which can be natural or synthetic. The waxes are generally solid at room temperature and have a weight average molecular weight of less than about 10,000. The binder component is preferably present in the foaming compositions of the invention in amounts greater than about 10% by weight of the total composition, generally from about 10 to about 100 parts, desirably from about 20 to about 80 parts, and preferably from about 25 parts or about 30 parts to about 50 parts or about 60 parts by weight based on 100 parts by weight of the blowing agent.

Examples of waxes suitable for the binder component of the present invention include, but are not limited to, amide waxes such as ethylene bis-stearamide wax and hydroxystearamide wax, maleated ethylene waxes, maleated propylene waxes, microcrystalline waxes, oxidized waxes, paraffin waxes, petroleum waxes, polyethylene waxes, PTFE waxes, ethylene vinyl acetate waxes, wax esters, and polycaprolactone wax, or combinations thereof. The preferred binder component is a mixture of ethylene bis-stearamide wax and hydroxystearamide wax, at a ratio of about 60% to about 40%, respectively based on the total binder component. A further preferred binder component is a mixture of polycaprolactone wax and polyolefin wax, preferably in equal amounts, or a mixture of ethylene bis-stearamide wax, hydroxystearamide wax, polycaprolactone wax, and polyolefin wax.

The foaming compositions of the present invention also include a surfactant component. Surfactants are generally used in the formula to de-dust, lubricate, reduce surface tension, and/or densify. Examples of surfactants include, but are not limited to mineral oil, castor oil, and soybean oil. The preferred surfactant is mineral oil, such as Drakeol 34 available from Pennreco. Maxsperse W-6000 and W-3000 solid surfactants are available from Chemax Polymer Additives. The surfactants can be in either solid or liquid form.

The surfactant component is utilized in the purge compositions of the present invention in amounts generally from about 1 to about 30 parts or about 50 parts, desirably from about 2 or about 5 to about 25 parts, and preferably from about 4 to about 10, or about 15, or about 20 parts by weight, based on 100 parts by weight of said blowing agent.

It has been unexpectedly found that some or all of the components of the compositions of U.S. Pat. No. 6,384,002, herein incorporated by reference along with continuation-in-part U.S. application Ser. No. 10/126,312, can be utilized to produce molded articles having reduced part weight, and reduce molding cycle times, and having other advantages as disclosed herein. That is, the abrasive component of U.S. Pat. No. 6,384,002 has been unexpectedly found useful in the present invention as a filler when utilized in amounts stated within this specification.

A filler component can also be utilized in the foaming compositions of the present invention. The filler component can aid in densifying the composition. Examples of suitable fillers include, but are not limited to, calcium carbonate, silica, alumina, sulfates, sulfides, talc, mica, or combinations thereof. Examples of commercially available fillers suitable for use in the abrasive component include, but are not limited to, Omyacarb® FT (calcium carbonate) available from Omya, Inc. and calcium carbonate available from Whittaker Clark and Daniels, talc (Talc 399) available from Whittaker, Clark and Daniels, and barium sulfate (2278 Blanc Fixe) available from Whittaker, Clark and Daniels.

The filler component is utilized in the foaming and flow improving compositions of the present invention in amounts generally from about 5 or about 10 parts to about 75 parts, desirably from about 20 parts to about 70 parts, and preferably from about 30 parts to about 60 parts by weight, based on 100 parts by weight of the blowing agent.

The foaming compositions of the present invention can optionally include at least one functional compounding additive to improve the flow of the polymeric material or resin in polymer processing equipment.

Examples of optional functional compounding additives or components include, but are not limited to clays, alkylated phenols and bisphenols, alkylidene bis, tris, and polyphenols, thio and dithio bis, tris and polyalkylated phenols, phenol condensation products, amines, esters, organic phosphites and phosphates, glycerol esters, quaternary ammonium compounds, anionic compounds, alkane sulfonate, spheriglas, antimony mercaptide, barium cadmium liquids and powders, barium cadmium zinc liquids and powders, barium calcium zinc powders and liquids, barium organic, barium powder, barium zinc liquids and powders, cadmium liquids, cadmium zinc liquids, calcium powders, calcium tin zinc pastes, liquids, and powders, calcium zinc pastes, liquids, and powders, epoxies, hydroxyl amines, leads, mixed metal soaps, phenols, phosphites, single metal soaps, tins, zinc and zinc complexes, catalysts, alcohol esters, complex esters, costabilizing lubricants, fatty acids, fatty acid amides, fatty acid esters, fatty alcohols, glycol esters, metallic stearates, aluminum, amorphous alumino silicate glass, barium, lithium, magnesium, sodium, stannous tin, amorphous and crystalline polypropylene, silicones, abietic derivatives, acetic acid derivative, azelatic acid derivatives, benzoic acid derivatives, butene derivatives, organic fillers, urea, zinc oxide, boron nitride, zinc stearate, calcium stearate, urea, zinc oxide, barium stearate, glycols, alkanolamines, oxidizing agents/peroxides, lead stearate, magnesium oxide, stearic acid, salicyclic acid, and diphenylguanidine (DPG), or a combination thereof.

Optional functional components also include microspheres. Microspheres are generally described as solid or hollow glass powders which comprise fused amorphous silica and inorganic oxides. The preferred microspheres are glass-based microspheres, and include, but are not limited to soda lime glass microspheres, barium titanate glass microspheres and metal-coated microspheres such as aluminum coated barium titanate glass microspheres. Suitable microspheres are available from Prizmalite of Michigan as P2015SL (soda lime glass microsphere), P2415BT (barium titanate glass microspheres), and P2453BTA (aluminum coated barium titanate glass microsphere).

A further optional functional component is an alumino silicate glass compound which can function as a processing aid for enhancing dispersion of polymers or other components when utilized in an injection molding process. The alumino silicate glass compounds are available from Vitrolite of Irvine, Calif. as powders or a polymeric co-mixture with a polymer such as polyethylene.

Yet a further optional functional component is a nanocomposite or organically modified clay. The preferred clays are cationic of medium or high cation exchange capacity. The cation exchange capacity is generally reported as the number of milliequivalents of exchangeable base which can be exchanged per 100 grams of clay. The cation exchange capacity varies from about 50 to about 150 depending on the type of clay. Examples of clays which can be organically modified include sepiolite, attapulgite, montmorillonites, bentonites, saponite and nentronite, with montmorillonites being preferred. Organically modified clays are known in the art and are also described in U.S. Pat No. 2,531,440. The preferred organically modified clays of the present invention are montmorillonite clay modified with ternary or quaternary ammonunium salts. The nano-composites are commercially available from Southern Clay Products, Inc. of Gonzales, Tex. as Cloisite® NA$^+$ (a natural montmorillonite), Cloisite® 93A & 30B (a natural montmorillonite modified with ternary ammonium salts), and Cloisite® 10A, 15A, 20A, and 25A (a natural montmorillonite modified with quaternary ammonium salts).

Salts of benzoic acid are also optional functional components of the present invention. Examples include lithium benzoate and sodium benzoate. Sodium benzoate is commercially available as powders or in an extruded form from Kalama Chemical, Inc. of Seattle, Wash.

The foaming compositions of the present invention can optionally include at least one functional compounding additive component including, but not limited to, nucleators, activators which lower the activation temperature of the blowing agent, plasticizers, mold release aids, processing aids, and antistatic additives.

The optional components including one or any combination of the above listed components are present in the composition in an amount generally from about 0 or about 1 part to about 100 parts, desirably from about 5 parts to about 50 parts, and preferably from about 8 or about 10 parts to about 20 or about 30, or about 40 parts by weight based on 100 parts of the blowing agent.

Typical prior art compositions are prepared or mixed at elevated temperatures in processing equipment such as extruders or two-roll mills. Conventional process equipment cannot be utilized to prepare the compositions of the present invention as the blowing agents would be prematurely activated by the relatively high temperatures. Accordingly, the compositions of the present invention are processed at temperatures less than or equal to about generally 200° F. or 180° F., desirably 160° F., and preferably 140° F.

While the preferred process for blending and preferably pelletizing the compositions of the present invention is described hereinbelow, it is to be understood other processes known in the art and variations of the preferred process can also be utilized. The components of the composition including at least one blowing agent in suitable amounts, minus any liquids and low temperature melting solids, are added to and mixed in a mixer, preferably a high intensity, bowl-type mixer known in the art and available from suppliers such as the Henschel Company of Germany. The mixer can be jacketed and connected to a temperature control system. The mixer has a rotary impeller that mixes as well as agitates the ingredients. The mixing action frictionally raises the temperature of the components. As the components are mixed, they are dispersed throughout the composition. When the temperature of the mixer reaches about 100° F., liquid components, if any, are added and the mixing is continued. At about 140° F. the low temperature melting solids, if any, are added to the composition and dispersed therein. The mixture is generally kept from exceeding the above stated temperatures. After a suitable period of mixing time the composition can be further processed immediately, or allowed to set at or below ambient temperature for any length of time. At this time, the composition can generally be described as granular or sand-like. The granular composition is subsequently cold compression molded into particles such as pellets, chips, or flakes, preferably pellets. By cold, it is meant that no external heat source such as gas or electricity is utilized in the compression molding process. Thus, the composition is processed below the above stated ranges. One such compression molding device is a die and roller type pellet mill which is well known in the art and available from manufacturers such as CPM of San Francisco, Calif. as Model CL series processors. Die and roller pelletizing utilizes compaction and extrusion to produce pellets ranging in length from about 0.015 to about 1 inch, depending on the die utilized. The granular material from a supply hopper is fed continuously in a controlled stream to a pelletizing cavity. Rotation of a die in contact with the rollers cause the same to turn. The material carried by the rotation of the die is compressed between the die and the roll and forced through holes in the die. As pellets of the composition are extruded, a knife or other suitable cutting surface shears the pellets into lengths. Die sizes, and thus the pellets produced thereby may range from about 0.015 inches to about 0.250 inches in diameter with preferred sizes being about 0.0625, 0.125, and 0.150 inches. Typically pellets are formed having a length about two or three times diameter.

The compositions of the present invention can be added to or melt blended with almost any known polymeric resin or material, both thermoplastic and thermosetting. Examples of thermoplastic polymeric material with which the compositions can be used include but are not limited to ABS resins prepared from acrylonitrile, butadiene and styrene; blends of ABS resins with other thermoplastics, such as, polyvinylchloride; diene resins; resins prepared from acrylonitrile, butadiene, styrene and alpha methyl styrene; resins prepared from butadiene, styrene and methacrylic acid; resins prepared from acrylonitrile, butadiene, styrene and methyl methacrylate acetal copolymers; acetal resins; acrylic resins and modified acrylic resins, such as, polymethyl methacrylate, copolymers of styrene and methyl methacrylate, copolymers of methyl methacrylate and alpha methyl styrene; the cellulosic plastics, such as, cellulose acetate plastics, cellulose acetate butyrate plastics, cellulose propionate plastics, ethyl cellulose plastics and cellulose nitrate plastics; mixtures of ethyl cellulose plastics and cellulose acetate butyrate; chlorinated polyether; the fluoroplastics such as, polytetrafluoroethylene, polyvinylidene fluoride, the fluorinate ethylene-propylene plastics and the chlorotrifluoroethylene plastics; the phenoxy resins; the polybutadiene-type resins, such as, butadiene-styrene copolymer and polybutadiene; the polycarbonates; polyolefins including polypropylene and polyethylene resins, such as, low-density polyethylene; copolymers of polyethylene with other materials; chlorinated polyethylenes; chlorosulfonated polyethylenes; ethylene vinyl acetate copolymer; ethylene acrylate copolymer; polyphenylene oxide; polypropylenes; the polysulfones; the polystyrenes; styrene copolymers, such as, styrene-methyl methacrylate copolymer; and vinyl polymers and copolymers, such as, polyvinyl chloride, copolymer of vinyl chloride and vinyl acetate, copolymer of vinyl chloride, vinyl acetate and vinyl alcohol, copolymer of vinyl chloride and vinylidene chloride, polyvinyidichloride, and combinations thereof.

Reinforced thermoplastics can be used. The reinforcing is normally done with glass fibers, metal fibers, refractory fibers, organic fibers such as from wood products and other fibers.

An important aspect of the present invention is that the foaming compositions are universal in nature and are compatible or miscible with a wide range of polymeric resins. The foaming compositions are substantially free (contain less than 5, 3, 2, or 1 parts per 100 parts of the composition), and preferably free of any thermoplastic or thermosetting polymer resin or material, or pigments, dyes, or the like. The compositions are also free of solvents, especially volatile organic solvent content (VOC).

The foaming compositions of the present invention can be added to a polymeric material prior to or during processing or molding in a suitable apparatus prior to forming a molded article in amounts that range generally from about 0.5 parts to about 20 parts, desirably from about 1 part to about 5 or 10 parts, and preferably from about 2 parts to about 3 or 4 parts by weight per 100 parts by weight of polymeric material. The foaming compositions of the present invention offer numerous advantages. Manufacturing costs are reduced as the compositions of the present invention include components heretofore contained in separate compositions. Part weight can also be reduced inasmuch as the blowing agent has been incorporated therein. Furthermore, incorporation of the blowing agent allows lesser amounts of natural resin to be utilized to produce a part. Cycle times can also be reduced. Overall, a great amount of versatility is offered by the foaming compositions of the present invention. Polymer processors can add the foaming compositions of the present invention to polymeric materials along with color masterbatches or concentrates in order to incorporate the beneficial advantages of the present invention. The compositions of the present invention can be utilized at temperatures generally from about 250° F. to about 600° F.

B) Purge Compositions

A further embodiment of the invention is a purge composition, and a method of use, that enables polymeric material or resin deposits to be removed from the inner surfaces of polymer processing equipment. The purge composition is in a concentrated form and is generally added at a desired ratio to a polymeric material or resin before or during addition to polymer processing machinery. The purge composition functions by scrubbing old resin deposits and other debris from the inner surfaces of the polymer processing machinery during a normal production cycle. Preferably, the purge composition is formulated to be most active over a temperature range that corresponds to the actual operating temperature range of the processing machinery. Numerous different formulations are described for the purge compositions. The compositions of the present invention advantageously can be utilized on machinery that is operating at low, standard, or high processing temperature ranges or anywhere therebetween.

The purging compositions of the present invention comprise various components including blowing agents, abrasives, binders, and surfactants. The compositions are preferably prepared utilizing a cold compression molding process, wherein the components such as the blowing agents are kept below temperature wherein the same would be activated or degraded.

Blowing or foaming agents are utilized in the purge compositions of the present invention. Blowing agents can be endothermic, exothermic, or a combination thereof. The specific blowing agent utilized is selected to be active at or below the processing temperature or range of the polymeric material being processed. Typical blowing agents, when activated, evolve or produce a gas such as nitrogen or carbon dioxide. As the gas evolves, the volume of the composition-polymeric material mixture expands within the processing device, resulting in the expansion of the mixture against the inner surfaces of the machinery causing an increase in the scrubbing action of the mixture which aids in the removal of the resin deposits. In order to prevent the blowing agent from prematurely activating or decomposing, the concentrate compositions are processed and preferably formed into particles such as pellets below the activation temperature of the blowing agent.

During molding of a polymeric material and a concentrate at elevated temperatures sufficient to degrade or activate the blowing agent, endothermic blowing agents will absorb heat as they degrade. The melt flow (polymer and composition) is placed under greater pressure by the blowing agent due to the evolution of gas. Accordingly, the pressure forces the mixture against the inner surfaces of the machinery wherein the other components of the composition, especially the abrasive component can beneficially act to cleanse the process equipment.

Blowing agents in general are utilized in the purge compositions of the present invention in amounts ranging from about 5 or about 10 to about 75 or 80 parts per 100 parts by weight of the composition, with about 25 to about 50 or about 60 parts being preferred. Endothermic blowing agents are utilized in the composition of the present invention in amounts which range generally from about 5 parts to about 50, about 60, or about 70 parts, desirably from about 25 parts to about 50 or about 55 parts, and exothermic blowing agents are utilized in amounts generally from about 5 parts to about 60 parts, and desirably from about 5 parts to about 30 or about 45 parts by weight based on 100 parts by weight of the composition.

An abrasive component is also utilized in the purge compositions of the present invention. The abrasive component advantageously has properties which can wear away by scraping, rubbing and/or grinding deposited polymeric material from the inner surfaces of the polymer processing equipment, such as an extruder barrel surface or injection screw, etc. The abrasive component generally works in a physical manner by scouring. Examples of suitable abrasive components include, but are not limited to, calcium carbonate, silica, alumina, sulfates, sulfides, talc, mica, or combinations thereof. The abrasive component can contain fine, medium, or course particles, or a distribution thereof to provide an effective abrasive action.

Examples of commercially available abrasives suitable for use in the abrasive component include, but are not limited to, Omyacarb® FT (calcium carbonate) available from Omya, Inc. and calcium carbonate available from Whittaker Clark and Daniels, talc (Talc 399) available from Whittaker, Clark and Daniels, clay (Burgess KE) available from Burgess Pigment Company, and barium sulfate (2278 Blanc Fixe) available from Whittaker, Clark and Daniels.

The abrasive component is utilized in the purge compositions of the present invention in amounts generally from about 5 or about 10 parts to about 75 parts, desirably from about 20 parts to about 70 parts, and preferably from about 25 parts to about 50 parts, based on 100 parts by weight of said composition.

The abrasive compositions of the present invention also include a surfactant component. Surfactants are generally used in the formula to de-dust and/or densify. Examples of surfactants include, but are not limited to mineral oil, castor oil, and soybean oil. The preferred surfactant is mineral oil, such as Drakeol 34 available from Pennreco. Maxsperse W-6000 and W-3000 solid surfactants are available from Chemax Polymer Additives. The surfactants can be in either solid or liquid form.

The surfactant component is utilized in the purge compositions of the present invention in amounts generally from about 1 to about 30 parts, desirably from about 2 or about 5 to about 25 parts, and preferably from about 4 to about 8 parts, based on 100 parts by weight of said composition.

A binder component is also utilized in the purge compositions of the present invention and is also described hereinabove. The binder can beneficially "wet" the other components present and render them more dispersible in the polymeric material added with the composition to purge the processing machinery. The binder components are waxes which can be natural or synthetic. The waxes are generally solid at room temperature and have a molecular weight of less than about 10,000 weight average. The binder component is present in the purge compositions of the invention in amounts greater than about 10% by weight, and generally from about 10 parts to about 50 parts, and preferably from about 10 parts to about 25 parts per 100 parts by weight of the composition.

The purge compositions of the present invention can optionally include at least one functional compounding additive component including, but not limited to, nucleators, activators which lower the activation temperature of the blowing agent, plasticizers, fillers, mold release aids, processing aids, antistatic additives, and lubricants as described hereinabove. The optional components including one or any combination of the above listed components are present in the purge compositions in an amount generally from about 0 or 1 part to about 98 parts, desirably from about 25 parts to about 50 parts, and preferably from about 10 parts to about 20 parts by weight based on 100 parts of the total composition.

The purge compositions of the present invention can be used in generally any polymer processing equipment known to the art which operate at temperatures generally from about 200° F. and above, and preferably from about 250° F. to about 600 or about 700° F. The components of the purge composition are chosen to be effective at and compatible with the predetermined processing temperature.

In a first embodiment, the purge composition is optimized for purging deposits from the polymer processing equipment that is operating at low processing temperatures, such as about 400° F. or less. This first purge composition includes an endothermic blowing agent (also known as a foaming agent), an abrasive, a low melt temperature binder, and a surfactant. The formulation for this embodiment is shown in Table 1.

TABLE 1

LOW TEMPERATURE PURGE COMPOSITION FORMULATION

| Purge Agent | Quantity in Formula (%) |
|---|---|
| MS01 Cenblo Mat 500 or equivalent endothermic blowing agent (e.g., coated sodium bicarbonate and citric acid) | 50 |
| Omyacarb ® FT or equivalent small particle calcium carbonate | 33 |
| Mineral Oil or equivalent surfactant | 2 |
| Cerit 220 powder or equivalent hydroxy stearamide wax | 15 |
| Total | 100% |

The preferred blowing agent in the first embodiment is the commercial product MS01 Cenblo Mat 500 available from Mats Corp. Ltd. (Markham, Ontario, L3R Canada). MS01 Cenblo Mat 500 is a carboxylic acid and carbonate based product. However, the formulation could include any other endothermic blowing agent which results in a purge composition which may be used to purge resin deposits as desired. Alternatively, a blowing agent could be prepared as a mixture of generic ingredients, such as a mixture of generic coated sodium bicarbonate and citric acid, or the like.

The abrasive in the first embodiment adds to the scrubbing action of the purge composition and also acts as a filler. The commercial product Omyacarb® FT available from Omya Inc. (Florence, Vt.) is the preferred abrasive in the first embodiment. Omyacarb® FT is a calcium carbonate based product. However, the formulation could include any other abrasive that would increase the scrubbing action of the purge composition for the removal of resin deposits. For example, another small particle calcium carbonate having an average particle size of not greater than about 1.5 microns can be substituted for the Omyacarb® FT. Preferably, the average particle size should be about 1.3 microns, as in the Omyacarb® FT product.

The preferred binder in the first embodiment is the commercial product Cerit 220 Powder available from E. W. Kaufman (Southamper, Pa.). Cerit 220 is a hydroxystearamide based product. A hydroxystearamide wax, or any other suitable alternative, can be substituted for the Cerit 220. Whichever binder is used, it should preferably be a low melt temperature binder which will release at approximately 220° F. The melted binder aids the incorporation of the purge composition into the melt flow of the resin. The surfactant in the first embodiment is mineral oil. However, any suitable surfactant having the ability to coat or wet out the inner surfaces of the polymer processing machinery can be substituted.

In a second embodiment, the purge composition has a more effective scrubbing action at standard processing temperatures, such as within the range of about 400° F.–500° F., whereas in the first embodiment the first composition exhibits a more effective scrubbing action at lower processing temperatures. The formulation of the second purge composition includes the same abrasives and surfactants as those included in the formulation of the first purge composition. However, the second formulation differs from the first in that the endothermic blowing agent and the binder are more appropriate for use at standard processing temperatures. The formulation for this embodiment is shown in Table 2.

TABLE 2

STANDARD TEMPERATURE PURGE COMPOSITION FORMULATION

| Purge Agent | Quantity in Formula (%) |
|---|---|
| MS01 Cenblo Mat 100 or equivalent endothermic blowing agent (e.g., coated sodium bicarbonate and citric acid) | 50 |
| Omyacarb ® FT or equivalent small particle calcium carbonate | 33 |
| Mineral Oil or equivalent surfactant | 2 |
| Advawax ® 280 or equivalent ethylene bis stearamide wax | 15 |
| Total | 100% |

The preferred blowing agent in the second embodiment is the commercial product MS01 Cenblo Mat 100 available from Mats Corp. Ltd. (Markham, Ontario, L3R Canada). MS01 Cenblo Mat 100 is a carboxylic acid and carbonate based product. However, any other endothermic blowing agent could be included in the composition as long as it results in a purge formulation capable of being used to purge resin deposits as desired. For example, a blowing agent could be prepared as a mixture of generic ingredients, such as a mixture of coated sodium bicarbonate and citric acid or the like, at a ratio effective for standard processing temperatures.

The preferred binder in the standard temperature purge composition is the commercial product Advawax® 280 available from Rohm & Haas Co. (Cincinnati, Ohio). Advawax® 280 is an N,N ethylene bis(stearamide) based product. However, an ethylene bis stearamide wax, or any other suitable alternative, can be substituted. The binder should be a low melt temperature binder which will release at approximately 280° F., thereby aiding the incorporation of the purge composition into the melt flow of the stream of resin.

The ratio of endothermic blowing agent to abrasive in both the first and second purge composition formulations is optimized to achieve a maximum scrubbing action.

In a third embodiment, the purge composition has a more effective scrubbing action at high processing temperatures, such as about 500° F. or higher, whereas the first and second purge compositions are more effective at low and standard processing temperatures, respectively. The third composition uses the same abrasives and surfactants as those listed for the first and second compositions. However, the third composition differs from both of the previous compositions in that it preferably uses an exothermic blowing agent and a binder than are appropriate for use at high processing temperatures. The formulation for this embodiment is shown in Table 3.

TABLE 3

HIGH TEMPERATURE PURGE COMPOSITION FORMULATION

| Purge Agent | Quantity in Formula (%) |
|---|---|
| Expandex ® 5PT or equivalent exothermic blowing agent (5-Phenyl tetrazole based chemistry) | 40 |
| Omyacarb ® FT or equivalent small particle calcium carbonate | 43 |
| Mineral Oil or equivalent surfactant | 2 |
| Advawax ® 280 or equivalent ethylene bis stearamide wax | 15 |
| Total | 100% |

The preferred blowing agent in the third embodiment is the commercial product Expandex® 5PT available from Uniroyal Chemical Company, Inc. (Middlebury, Conn.). Expandex® 5PT is a 5-phenyl tetrazole based product. However, the composition could include any other exothermic blowing agent which results in a purge composition which may be used to purge resin deposits as desired. The action of the exothermic blowing agent will preferably be based on 5-Phenyltetrazole chemistry. Alternatively, other high temperature formulations might use an endothermic blowing agent, such as Mat 201 or Mat 101 (Mats Corp. Ltd., Markham, Ontario, L3R Canada), as long as the endothermic blowing agent results in a desired level of resin deposit removal at these high temperatures. Mat 201 and Mat 101 are chemical blends of polycarbonic acids, inorganic carbonates, and stearates.

In its most preferred embodiment, the formulation for the third purge composition has an optimal ratio of exothermic blowing agent to abrasive that results in maximum scrubbing action at high temperatures. The average particle size of the abrasive is the same as that noted for use in the previous formulations. The preferred binder of the high temperature purge composition is the commercially available product Advawax® 280 (Rohm & Haas Co., Cincinnati, Ohio). Advawax® 280 is an N,N ethylene bis(stearamide) based product. However, an ethylene bis stearamide wax, or any other suitable alternative, can be substituted. The binder should be a low melt temperature binder which will release at approximately 280° F.

A further example of a purge composition suitable at least for high temperature processing range is set forth in Table 4 below. An endothermic blowing agent is utilized in this formulation.

TABLE 4

HIGH TEMPERATURE PURGE COMPOSITION FORMULATION

| | |
|---|---|
| Matendo P80 (exothermic blowing agent) | 50 |
| Omyacarb ® 4 (calcium carbonate) | 19 |
| Drakeol 34 (mineral oil) | 25 |
| Advawax ® 280 (ethylene bis stearamide wax) | 6 |
| Total | 100% |

The present invention further provides a method for purging resin deposits from the processing or inner surfaces of polymer processing machinery. The method includes feeding a mixture comprised of a foaming agent, an abrasive, a surfactant, and a binder into the stream of resin in the polymer processing equipment. The mixture is poured from a container directly into a hopper of the polymer processing equipment and is added directly to the stream of resin moving through the barrel of the processing equipment. As the die and other tooling surfaces are thus cleaned in accordance with the invention, the resulting molded articles may have undesirable ingredients attributable to the purge composition. Some of these articles may be recycled in the same or a compatible stream of resin.

As the purge concentrate mixes with the stream of resin, the mixture is heated as it moves along the barrel of the machinery. The binder that holds the components of the purge composition together then melts into the stream of resin, thereby releasing the individual components of the composition into the stream of resin. Incorporation of the purge composition into the melt flow is additionally aided by the presence of the melted binder.

The blowing agent begins to degrade when it reaches the appropriate elevated temperature within the processing machinery. This degradation results in the production of gas bubbles within the melt flow. As the quantity of gas increases within the resin/purge composition mixture, the volume of the mixture expands. The subsequent increase in pressure which results from the expansion of the mixture against the inner surfaces of the machinery causes an increase in the scrubbing action of the mixture which aids in the removal of resin deposits.

The abrasive component of the purge composition is released along with the blowing agent as the binder melts into the stream of resin. Additional scrubbing action is added by the abrasive to the resin mixture, and the abrasive additionally functions as sites of nucleation for the newly forming gas bubbles produced by the degradation of the blowing agent. The small size of the abrasive particles, i.e., less than 1.5 microns, increases the number of potential nucleation sites which results in a more even distribution of the gas bubbles within the melt flow. An even dispersion of the gas within the stream of resin helps to improve the scrubbing action of the purge concentrate along the inner surfaces of the processing machinery. The processing machinery containing the purge composition is operated until the molded composition exiting the machine appears clean, thereby indicating that the internal parts of the machine are clean.

The exothermic chemistry involved in the degradation of the exothermic blowing agent typically generates 3 to 5 times the amount of gas produced by the endothermic chemistry associated with the degradation of the endothermic blowing agent. Therefore, due to the greater amount of gas generated by the exothermic agent, less blowing agent is required to achieve sufficient gas production.

Typical prior art compositions are prepared or mixed at elevated temperatures in processing equipment such as extruders or two-roll mills. Conventional process equipment cannot be utilized to prepare the compositions of the present invention as the blowing agents would be prematurely activated by the relatively high temperatures. Accordingly, the purge compositions of the present invention are processed at temperatures less than or equal to about generally 200° F. or about 180° F., desirably less than or equal to 160° F. and preferably less than or equal to about 140° F. The purge compositions are preferably prepared utilizing cold compression molding as described hereinabove.

An important aspect of the present invention is that the purge compositions are universal in nature and are compatible or miscible with a wide range of the above polymeric resins. The compositions of the present invention can be added to or melt blended with almost any known polymer, resin, or material, both thermoplastic and thermosetting as also described hereinabove.

In accordance with another feature of the invention, the performance of the purge composition may be affected by the ratio of purge concentrate to resin. The purge concentrate is added to a stream of polymer, resin, etc. in an amount generally from about 1 to about 25, 50 or 100 parts, desirably from about 2 to about 20 parts, and preferably from about 3 or 4 to about 10 or 15 parts per 100 parts of resin prior to or during the purging operation. Higher amounts of purge concentrate are generally utilized when a greater level of scrubbing is required for sufficient cleaning of the machinery.

The foregoing invention will be better understood by reference of the following examples which serve to illustrate, but not to limit the present invention.

EXAMPLES

The following examples illustrate the advantages and benefits of the foaming compositions of the present invention when compared to natural resin without the present invention. 4"×6"×0.125" (10.16 cm×15.24 cm×0.318 cm) plaques were molded on a 120-Ton Van Dorn injection molding machine having a general purpose screw and 28 ounce barrel capacity. In each experiment 10 plaques were molded for each set of data and the reported data is the average thereof.

Example 1

The first example utilized Basell SD-242 Polypropylene resin. The injection molding temperature settings were as follows: Nozzle 440° F., Front Zone 440° F., Center Zone 440° F., and Rear Zone 440° F. The present invention composition was in an amount of 2 parts per 100 parts by weight of the polypropylene resin. The composition contained the following components.

| Present Invention Composition | Quantity in Formula (Parts) |
|---|---|
| Endothermic blowing agent (coated sodium bicarbonate and citric acid) Cenblo Mat 100 | 50 |
| Filler (calcium carbonate) Omyacarb ® FT | 25 |
| Binder (ethylene bis stearamide wax) Advawax ® 280 | 21 |
| Surfactant (mineral oil) Drakeol 34 | 4 |
| Total (parts) | 100 |

| Results | Control (Natural Resin) | Present Invention | Reduction % vs. Control |
|---|---|---|---|
| Part weight (grams) | 450.39 | 420.37 | 6.70% |
| Mold Closed Time (seconds) | 35.00 | 20.00 | 42.80% |
| Peak Injection Pressure (psi) | 457.09 | 301.03 | 34.14% |
| Shot size (inches) | 2.30 | 2.10 | 8.70% |
| Cycle time (seconds) | 52.00 | 38.00 | 26.92% |

As can be seen from the above chart, the compositions of the present invention including a blowing agent result in dramatic improvements in the measured properties. Less resin is utilized and the part weight can be decreased, offering a cost savings when compared to the control composition. Furthermore, the mold closed time and cycle times were reduced allowing part throughput to be increased, thus providing labor or time savings to the molder.

Example 2

The second example utilized Dow 128 Polyethylene. The injection molding temperature settings were as follows: Nozzle 400° F., Front Zone 400° F., Center Zone 400° F., and Rear Zone 400° F. The present invention composition was in an amount of 2 parts per 100 parts by weight of the polyethylene resin. The compositions contained the following components.

| Present Invention Composition | Quantity in Formula (Parts) |
|---|---|
| Endothermic blowing agent (coated sodium bicarbonate and citric acid) Cenblo Mat 500 | 50 |
| Filler (calcium carbonate) Omyacarb ® FT | 25 |
| Binder (ethylene bis stearamide wax) Advawax ® 280 | 21 |
| Surfactant (mineral oil) Drakeol 34 | 4 |
| Total (parts) | 100 |

| Results | Control (Natural Resin) | Present Invention | Reduction % vs. Control |
|---|---|---|---|
| Part weight (grams) | 469.06 | 438.08 | 6.70% |
| Mold Closed Time (seconds) | 35.00 | 15.00 | 57.20% |
| Peak Injection Pressure (psi) | 410.39 | 377.35 | 8.05% |
| Shot size (inches) | 2.30 | 2.10 | 8.70% |
| Cycle time (seconds) | 51.00 | 39.00 | 23.5% |

As can be seen from the above chart, the compositions of the present invention including a blowing agent result in dramatic improvements in the measured properties. Less resin is utilized and the part weight can be decreased, offering a cost savings when compared to the control composition. Furthermore, the mold closed time and cycle times were reduced allowing part throughput to be increased, thus providing labor or time savings to the molder.

Example 3

The third example utilized GE MC 8002 Polycarbonate. The injection molding temperature settings were as follows: Nozzle 520° F., Front Zone 520° F., Center Zone 520° F., and Rear Zone 520° F. The present invention was utilized in an amount of 2 parts per 100 parts by weight of the polycarbonate resin. The compositions contained the following components.

| Present Invention Composition | Quantity in Formula (Parts) |
| --- | --- |
| Endothermic blowing agent (coated sodium bicarbonate and citric acid) Matendo P80 | 50 |
| Filler (calcium carbonate) Omyacarb ® FT | 25 |
| Binder (ethylene bis stearamide wax) Advawax ® 280 | 21 |
| Surfactant (mineral oil) Drakeol 34 | 4 |
| Total (parts) | 100 |

| Results | Control (Natural Resin) | Present Invention | Reduction % vs. Control |
| --- | --- | --- | --- |
| Part weight (grams) | 573.26 | 550.29 | 4.00% |
| Mold Closed Time (seconds) | 35.00 | 20.00 | 42.80% |
| Peak Injection Pressure (psi) | 1308.75 | 1060.75 | 18.95% |
| Shot size (inches) | 2.40 | 2.28 | 5.00% |
| Cycle time (seconds) | 50.90 | 30.71 | 39.7% |

As can be seen from the above chart, the compositions of the present invention including a blowing agent result in dramatic improvements in the measured properties. Less resin is utilized and the part weight can be decreased, offering a cost savings when compared to the control composition. Furthermore, the mold closed time and cycle times were reduced allowing part throughput to be increased, thus providing labor or time savings to the molder.

While in accordance with the patent statutes the best mode and preferred embodiment have been set forth, the scope of the invention is not limited thereto, but rather by the scope of the attached claims.

What is claimed is:

1. A composition which foams upon being heated to predetermined temperature, comprising: a blowing agent; a binder component in an amount from about 10 to about 100 parts by weight, said binder component being a wax having a weight average molecular weight of less than 10,000; a surfactant in an amount from about 1 to about 50 parts by weight; and a filler component in an amount from about 5 to about 75 parts by weight, wherein said composition has been processed at a temperature below an activation temperature of said blowing agent in order to prevent premature degradation, wherein said composition is in a solid particulate form; and wherein said parts by weight are based on 100 parts by weight of said blowing agent.

2. A composition according to claim 1, wherein said blowing agent is an endothermic blowing agent, an exothermic blowing agent, or a combination thereof.

3. A composition according to claim 2, wherein said particulate form is a pellet, chip or flake and wherein the blowing agent is selected from the group consisting of a polycarbonic acid, coated sodium bicarbonate, coated citric acid, coated monosodium citrate, coated sodium citrate, azodicarbonamide, modified azodicarbonamide, oxybis benzene sulfony hydrazide, toluenesulfony-hydrazide, 5-phenyltetrazole, diisopropylhydrazodicarboxylate, dinitrosopentamethylenetetramine, and combination thereof.

4. A composition according to claim 2, wherein said wax is an ethylene bis-stearamide wax, a hydroxystearamide wax, a polycaprolactam wax, a polyolefin wax, or a combination thereof.

5. A composition according to claim 2, wherein said binder is present in an amount from about 25 parts to about 50 parts by weight, wherein said surfactant is present in an amount from about 4 parts to about 20 parts by weight, and wherein said filler is present in an amount from about 30 parts to about 60 parts by weight.

6. A composition according to claim 5, wherein said composition further includes a functional compounding additive in an amount from about 1 part to about 100 parts by weight.

7. A composition according to claim 6, wherein said surfactant is mineral oil, castor oil, soybean oil, or a combination thereof.

8. A composition according to claim 7, wherein said filler is calcium carbonate, silica, alumina, talc, a sulfate, a sulfide, mica, or a combination thereof.

9. A molded article comprising a polymeric material and a composition according to claim 8.

10. A composition according to claim 7, wherein the functional compounding additive is a nano-composite of a clay selected from the group consisting of sepiolite, attapulgite, montmorillonites, bentonites, saponite, nentronite, and combinations thereof.

11. A composition according to claim 7, wherein the functional compounding additive is an organically modified montmorillonite clay.

12. A composition according to claim 7, wherein the functional compounding additive is selected from the group consisting of a phenol, a bisphenol, a stearate, a phosphite, a phosphate, an ester, an amine, a fatty acid, a fatty acid amide, a silicate glass, a hollow or solid microsphere, a peroxide, a benzoate, diphenylguanidine, and combinations thereof.

13. A method for preparing a foamable composition for use in polymeric materials, comprising the steps of: compounding said foamable composition comprising at least one blowing agent, a binder component in an amount from about 10 to about 100 parts by weight, said binder component being a wax having a weight average molecular weight of less than 10,000, a surfactant in an amount from about 1 to about 50 parts by weight, a filler component in an amount from about 5 to about 75 parts by weight and optionally, a functional comnounding additive, said parts by weight based on 100 parts by weight of said blowing agent; mixing said composition at a temperature below the activation temperature of said blowing agent; and cold compression molding said composition into a particulate form.

14. A method for preparing a foamable composition according to claim 13, wherein said cold compression molding step is conducted at a temperature below the activation temperature of said at least one blowing agent.

15. A method according to claim 14, wherein said at least one blowing agent is an endothermic blowing agent, an exothermic blowing agent, or a combination thereof.

16. A method according to claim 13, wherein said wax is an ethylene bis-stearamide wax, a hydroxystearamide wax, a polycaprolactam wax, a polyolefin wax, or a combination thereof.

17. A method according to claim 16, wherein said binder is present in an amount from about 25 parts to about 50 parts by weight, wherein said surfactant is present in an amount from about 4 parts to about 10 parts by weight, and wherein said filler is present in an amount from about 30 parts to about 60 parts by weight.

18. A method according to claim 17, wherein said composition further includes a functional compounding additive in an amount from about 1 part to about 100 parts by weight.

19. A method according to claim 18, wherein said filler is calcium carbonate, silica, alumina, talc, a sulfate, a sulfide, mica or a combination thereof.

20. A molded article comprising a composition of claim 1, and a polymeric material.

* * * * *